(12) United States Patent
Anliker et al.

(10) Patent No.: US 8,727,059 B2
(45) Date of Patent: May 20, 2014

(54) HINGE ASSEMBLY FOR CONNECTING TWO VEHICLE PARTS TO A VEHICLE WITH ARTICULATED FRAME STEERING

(75) Inventors: Christoph Anliker, Langenthal (CH); Lino Giovanoli, Bivio (CH)

(73) Assignee: Ammann Schweiz AG, Langenthal (CH)

( * ) Notice: Subject to any disclaimer, the term of this patent is extended or adjusted under 35 U.S.C. 154(b) by 82 days.

(21) Appl. No.: 13/148,991

(22) PCT Filed: Feb. 12, 2009

(86) PCT No.: PCT/CH2009/000061
§ 371 (c)(1),
(2), (4) Date: Sep. 20, 2011

(87) PCT Pub. No.: WO2010/091517
PCT Pub. Date: Aug. 19, 2010

(65) Prior Publication Data
US 2012/0000723 A1 Jan. 5, 2012

(51) Int. Cl.
*B60K 17/00* (2006.01)
(52) U.S. Cl.
USPC ........... 180/235; 180/234; 180/418; 180/419; 280/468; 280/456.1; 280/460.1
(58) Field of Classification Search
USPC .................. 180/235, 234, 418, 419; 280/468, 280/456.1, 460.1
See application file for complete search history.

(56) References Cited

U.S. PATENT DOCUMENTS

| | | | | |
|---|---|---|---|---|
| 3,302,742 A * | 2/1967 | Sunderlin | ...................... | 180/420 |
| 3,349,864 A * | 10/1967 | Wagner | ......................... | 180/235 |
| 3,367,437 A * | 2/1968 | Garrett | ........................... | 180/238 |
| 3,966,345 A * | 6/1976 | Kofel | .............................. | 404/126 |
| 4,034,822 A * | 7/1977 | Stedman | ....................... | 180/235 |
| 4,245,714 A * | 1/1981 | Kersey | ........................... | 180/265 |
| 4,444,409 A * | 4/1984 | Garrison | ....................... | 280/492 |
| 4,471,850 A * | 9/1984 | Rotz | .............................. | 180/420 |

(Continued)

FOREIGN PATENT DOCUMENTS

| | | |
|---|---|---|
| DE | 3136158 A1 | 6/1982 |
| EP | 1111134 A2 | 6/2001 |

OTHER PUBLICATIONS

International search report for PCT/CH2009/000061 dated Oct. 12, 2009.

*Primary Examiner* — Kevin Hurley
*Assistant Examiner* — Michael Stabley
(74) *Attorney, Agent, or Firm* — McCormick, Paulding & Huber LLP

(57) ABSTRACT

The invention relates to a hinge assembly for connecting two vehicle parts to a vehicle that is capable of crab steering, has articulated frame steering and comprises articulating vehicle axles. Four structural elements are connected to each other by four hinge connections, the hinge centers being arranged in a common plane in a basic state, such that they form a frame which is substantially rigid with respect to thrust forces in that plane. Two of the structural elements forming opposite sides of the frame can in each case be rotated about a rotational axis located in said plane with respect to the other three structural elements. Furthermore, the hinge connections are designed in such a manner that, starting from the basic state, the two rotational axes can be articulated relative to each other in that one of the rotational axis can be pivoted out of the plane.

19 Claims, 8 Drawing Sheets

(56) References Cited

U.S. PATENT DOCUMENTS

| | | | |
|---|---|---|---|
| 4,809,805 A * | 3/1989 | Short | 180/420 |
| 5,725,063 A * | 3/1998 | Ceragioli et al. | 180/14.4 |
| 6,206,118 B1 * | 3/2001 | Menze et al. | 180/14.1 |
| 6,345,932 B1 | 2/2002 | Fix | |
| 6,460,643 B1 * | 10/2002 | Degelman | 180/89.12 |
| 6,581,718 B1 * | 6/2003 | Vigren et al. | 180/420 |

* cited by examiner

HINGE ASSEMBLY FOR CONNECTING TWO VEHICLE PARTS TO A VEHICLE WITH ARTICULATED FRAME STEERING

CROSS REFERENCE TO RELATED APPLICATIONS

This application claims the priority of PCT Application No. PCT/CH2009/000061, filed on Feb. 12, 2009, the disclosures of which are incorporated herein by reference in their entirety.

TECHNICAL FIELD

The invention concerns a hinge assembly for connecting two vehicle parts to a vehicle that is capable of crab steering, has articulated frame steering and comprises articulating vehicle axles as well as a vehicle with articulated frame steering comprising such a hinge assembly according to the preambles of the independent claims.

BACKGROUND ART

Vehicles with articulated frame steering predominantly are used as construction or forest vehicles, for which a good maneuverability in cramped confines is crucial. In such vehicles two vehicle parts comprising in each case vehicle axles are connected by an articulated joint with each other. The change in direction is effected by a horizontal pivoting ("buckling") of the vehicle parts with the vehicle axles arranged at them relative to each other about the hinge center of the articulated joint, resulting in a more or less curved driving course dependent on the pivoting angle.

In case such vehicles with articulated frame steering shall optionally be capable to be operated in a mode in which the vehicle axles seen in longitudinal direction of the vehicle or in driving direction, respectively, are offset (so called "crab steering"), what in particular is the case at street rollers for the compaction of asphalt, the mounting point of the articulated joint at least at one of the two vehicle parts is designed in such a manner that it can be displaced in horizontal direction transverse to the driving direction, so that the respective vehicle part with the vehicle axle mounted at it can be displaced in horizontal direction transverse to the driving direction with respect to the articulated joint. As further embodiment it is known to use a double articulated joint for enabling the crab steering. Such double articulated joints consist of two conventional articulated joints of which each one is, with one of its hinge halves, connected with one of the two vehicle parts and with its other hinge half, at a distance, to the respective other articulated joint.

In case in addition to the crap steering capability an articulation of the vehicle axles relative to each other shall be possible, thus a rotation of them relative to each other about a rotational axis running in longitudinal direction of the vehicle or in driving direction, respectively, what in particular is the case at vehicles having a large track or roller width, respectively, according to the prior art the articulated joint or the double articulated joint, respectively, is connected to one of the two vehicle parts via an additional hinge connection, which allows a rotation between this vehicle part and the articulated joint or the double articulated joint, respectively, about a rotational axis which is running in longitudinal direction of the vehicle.

However, the vehicle known today which permit an operation in crab steering mode as well as permit an articulation of the vehicles axles compared to simple vehicle with articulated frame steering or double articulated frame steering, respectively, have the disadvantage that in addition to the articulated joint or the double articulated joint, respectively, they need further moveable assemblies, resulting in higher manufacturing and maintenance costs and necessarily also in a larger vehicle length with a corresponding loss in maneuverability.

DISCLOSURE OF THE INVENTION

Hence, there rises the object to provide a vehicle that is capable of crab steering, has articulated frame steering and comprises articulating vehicle axles as well as to provide a hinge assembly for the formation of such a vehicle by connecting two vehicle parts, which in each case comprise a vehicle axle, with the hinge assembly, which do not show the disadvantages of the prior art or at least partially avoid them.

This object is achieved by the hinge assembly and the vehicle with articulated frame steering according to the independent claims.

A first aspect of the invention concerns a hinge assembly, by means of which two vehicle parts comprising in each a case vehicle axle that is in particular fixedly connected to the respective vehicle part, can be connected to form a vehicle that is capable of crab steering, has articulated frame steering and comprises articulating vehicle axles. As has already been mentioned at the outset, under "crab steering" an operation mode is understood in which the vehicle is operated having its axles, seen in longitudinal direction of the vehicle or in driving direction, respectively, sideways offset relative to each other. Under a capability of articulating of the vehicle axles relative to each other it is understood the possibility that the vehicle axles can rotate relative to each other about a rotational axis running in longitudinal direction of the vehicle or in driving direction, respectively.

The hinge according to the invention comprises four structural elements, which are connected to each other by four hinge connections, wherein each of the structural elements connects exactly two hinge connections with each other. The structural elements can exclusively be embodied as in each case rigid structural elements, i.e. in such a manner that the respective structural element fixedly interconnects the two hinge connections which are connected by it at a fixed distance (e.g. rigid pipe, profile or housing elements), or can also partially be embodied as structural elements which can change their dimensions, such, that the concerned structural element interconnects the two hinge connections connected by it at a distance which can be changed by purposeful adjustment or as a function of an acting force (e.g. supports which can be adjusted in length or spring/damper support elements which are rigid with respect to buckling, know from automotive engineering).

Furthermore the connection of the structural elements by the hinge connections is designed in such a manner that the structural elements together with the hinge connections connecting them in a basic state, in which the hinge centers of the hinge connections are located in a common plane and by that according to the claims define a plane, form a closed frame which is substantially rigid with respect to thrust forces acting along that plane. The term "hinge center" means here in relation to a ball joint the center of the ball of the ball joint and related to a pivot joint the rotational axis of the pivot joint. Under a frame which is substantially rigid with respect to thrust forces, a frame is understood here which due to its design in the before mentioned plane is completely stiff with respect to its angles or can merely change its angles on the basis of a designed changeability of a structural element which is dependent on an acting force, e.g. in the case that one of the structural elements between two hinge connections is designed as spring/damper support element which is rigid with respect to buckling.

Two of the structural elements, which are forming two opposing sides of the frame which is substantially rigid with respect to thrust forces, can in each case be rotated, in the two hinge connection which the respective structural element connects with each other, about a rotational axis with respect to the two remaining structural elements and to the respective other structural element which can be rotated. The rotational axis in the basic state in each case run in the plane defined by the hinge centers.

Furthermore can one of the two before mentioned structural elements, which can be rotated, together with one of the two before mentioned remaining (non-rotatable) structural elements, to which in each case it is directly connected by one of the hinge connections, starting from the basic state in which the hinge centers of the hinge connections are located in a common plane, be tilted with respect to the other two structural elements, i.e. with respect to the other structural element which can be rotated and to the other remaining structural element, in such a manner that the hinge center of the hinge connection, which connects said two tiltable structural elements, to both sides can be pivoted out of the plane defined by the hinge centers in the basic state without the hinge centers of the other three hinge connections having to leave this plane. From this it results the possibility of an articulation relative to each other of the rotational axis of the two structural elements which can be rotated.

Thus, in other words the first aspect of the invention concerns a hinge assembly for connecting two vehicle parts to a vehicle that is capable of crab steering, has articulated frame steering and comprises articulating vehicle axles, comprising four structural elements which are connected to each other by four hinge connections, the hinge centers of which are arranged in a common plane in a basic state in such a manner that they form a frame which is substantially rigid with respect to thrust forces in that plane. Two of the structural elements forming opposite sides of the frame which is substantially rigid with respect to thrust forces in each case can be rotated about a rotational axis located in said plane with respect to the respective other three structural elements. In addition, the hinge connections are designed in such a manner that, starting from the basic state, the two rotational axis can be articulated relative to each other in that one of the rotational axis can be pivoted out of the plane.

With the hinge assembly according to the invention it becomes possible to form, without additional moveable assemblies, such as swivel joints and transversely displaceable connecting elements, together with two vehicle parts comprising vehicle axles a vehicle that is capable of crab steering, has articulated frame steering and comprises articulating vehicle axles, in that the two structural elements of the hinge assembly which can be rotated, in each case are connected with one of the two vehicle parts. Through this it becomes possible to provide and to service such vehicles at relative low costs. Furthermore, through this an especially compact design of such vehicles is made possible.

In a preferred embodiment of the hinge assembly between two of the structural elements stop means are arranged, which limit the ability of the hinge center of the hinge connection connecting the two tiltable structural elements to be pivoted out of the plane defined in the basic state by the hinge centers and therewith the articulating capability relative to each other of the rotational axis of the structural elements which can be rotated. This is meaningful in order to avoid operating states in which there exists an excessive articulating of these rotational axis, since with an increasing articulation the rigidity with respect to thrust forces of the frame formed by the structural elements and the hinge connections in a direction, which runs in the plane formed by the hinge centers in the basic state, decreases.

Preferably, the before mentioned limitation of the ability to be pivoted is effected symmetrically to this plane, so that an articulation of the rotational axis of the structural elements which can be rotated is limited in both articulating directions to the same degree.

Also it is preferred that the stop means are formed between two structural elements which are directly connected which each other by one of the hinge connections. In this way a direct acting, robust limitation of the articulating ability relative to each other of the rotational axis of the structural elements which can be rotated can be realized.

In a further preferred embodiment of the hinge assembly between each of the two structural elements which can be rotated and one of the two remaining structural elements in each case adjustment means are arranged, for setting and locking of a specific rotation angle of the respective structural element which can be rotated relative to the two remaining (non-rotational) structural elements and the respective other structural element which can be rotated. By means of this it is possible to individually adjust the rotation of each of the two structural elements which can be rotated with respect to the two remaining structural elements and thereby accomplish in each case the steering of a vehicle with articulated frame steering formed with this hinge assembly. For adjustment of a specific offset in the crab steering mode, in this embodiment the adjustment means arranged at the two structural elements which can be rotated must be adjusted in a coordinated manner. Suitable adjustment means are for example hydraulic piston-cylinder assemblies or electric spindle drives.

In another preferred embodiment of the hinge assembly which is alternative to the preceding preferred embodiment, between one of the two structural elements which can be rotated and one of the two remaining (non-rotatable) structural elements adjustment means are arranged, for setting and locking of a specific rotation angle of said structural element which can be rotated relative to the two remaining structural elements. Furthermore, between the two structural elements which can be rotated, adjustment means are arranged, for setting and locking of a specific rotation angle of the two structural elements which can be rotated relative to each other. By this it is possible to accomplish, at a vehicle with articulated frame steering formed with this hinge assembly, the steering and the adjustment of the offset in the crab steering mode practically independently of each other. By means of the adjustment means arranged between the two structural elements which can be rotated, the steering angle of the vehicle can be adjusted without substantially changing a possible crab steering offset, and by means of the adjustment means arranged between one of the two structural elements which can be rotated and one of the two remaining (non-rotatable) structural elements a crab steering offset can be set, without substantially changing the currently adjusted steering angle by doing so. Here as well hydraulic piston-cylinder assemblies or electrical spindle drives are examples for suitable adjustment means.

In the two before mentioned alternative preferred embodiments of the hinge assembly it is preferred that none of the adjustment means is linked to those of the two remaining structural elements which, for permitting an articulation relative to each other of the rotational axis of the two structural elements which can be rotated, can be tilted together with one of the two structural elements which can be rotated in such a manner, that the hinge center of the hinge connection which connects these two structural elements is pivoted out of the plane defined in the basic state by the hinge centers. This is meaningful in order to avoid a limitation of the articulating capability by the adjustment means.

Further it is preferred in the before mentioned preferred embodiments of the hinge assembly with adjustment means that at least a part of the linkage points of the adjustment means at the structural elements is designed as a cardan joint and not as a ball joint, which is otherwise envisaged, since by this especially compact hinge assemblies having a relative small distance between the rotational axis of the two structural elements which can be rotated can be realized.

In still a further preferred embodiment of the hinge assembly the four structural elements are connected by three hinge connections which are designed as ball joints and by one further hinge connection, which ensures the rigidity with respect to thrust forces of the frame formed by the structural elements and the hinge connections.

In that case it is furthermore preferred that this further hinge connection is designed in such a manner that as its sole degree of freedom it permits a rotation of the two structural elements connected by it relative to each other about a rotational axis which runs in the plane that is in the basic state defined by the hinge centers. Such an embodiment of the hinge assembly is cost-efficient and robust.

In still a further preferred embodiment of the hinge assembly in the basic state the rotational axis of the two structural elements which can be rotated run parallel to each other in the plane defined be the hinge centers, in another preferred embodiment they run non-parallel to each other. Dependent on the use of the hinge assembly the first one or the other one of the embodiments can be more preferably. For example in cases where the rotational axis run parallel, a rather neutral steering behavior of a vehicle with articulated frame steering formed with the hinge assembly results, while on the contrary a purposeful non-parallel arrangement of the rotational axis can effect a specific steering characteristic, e.g. a steady directional stability due to resetting forces generated from the position of the rotational axis when being displaced out of the basic state.

In both embodiment alternatives it is envisaged in a preferred embodiment that the (parallel or non-parallel) position, at which the rotational axis of the two structural elements which can be rotated in the basic state run relative to each other in the plane defined by the hinge centers, can be changed.

In that case it is further preferred that the position of the rotational axis can be changed in that the distance of two hinge connections relative to each other, which in each case are dedicated to another of the two rotational axis of the two structural elements which can be rotated, is adjustable, e.g. in that the structural element, which interconnects these two hinge connections, is designed as hinged column which is adjustable in its length. By this it is possible to significantly modify or adapt to specific requirements the steering behavior of a vehicle with articulated frame steering formed with the hinge assembly.

Furthermore it is preferred in that case that the position of the rotational axis can be changed in that the distance of two hinge connections relative to each other, which in each case are dedicated to another of the two rotational axis of the two structural elements which can be rotated, is adjustable in dependency on the tensile and/or thrust forces along the plane which is defined in the basic state by the hinge centers of the hinge connections, preferably against a spring force, which in case of a relief effects a resetting. In order to realize such an embodiment, the structural element that connects these two hinge connections could, for example, be embodied as a spring/damper support element which is rigid with respect to buckling. Furthermore, additionally a general adjustability as before described can be envisaged, by which the distance of the two hinge connections to each other in the unloaded state can be adjusted, and thereby the position of the rotational axis relative to each other in the unloaded state.

A second aspect of the invention concerns a vehicle with articulated frame steering having two vehicle parts comprising in each case a vehicle axle, which by a hinge assembly according to the first aspect of the invention in an articulated frame steering manner are connected to each other, in that each of the two vehicle parts is connected with one of the two structural elements of the hinge assembly which can be rotated. The formation of such a vehicle is a preferred use of the hinge assembly according to the invention.

Preferably, the vehicle with articulated frame steering is a tandem roller for compacting asphalt, with two plain rolls, with one rubber wheel axle and one plain roll or with two rubber wheel axles. At such vehicles the advantages of the invention especially clearly become apparent.

BRIEF DESCRIPTION OF THE DRAWINGS

Further embodiments, advantages and uses of the invention arise from the dependent claims and the following description on the basis of the drawings.

The FIGS. 1 and 2 are perspective top views diagonal from above in two different directions onto a hinge assembly according to the invention.

DESCRIPTION OF THE PREFERRED EMBODIMENTS

Figure 3:
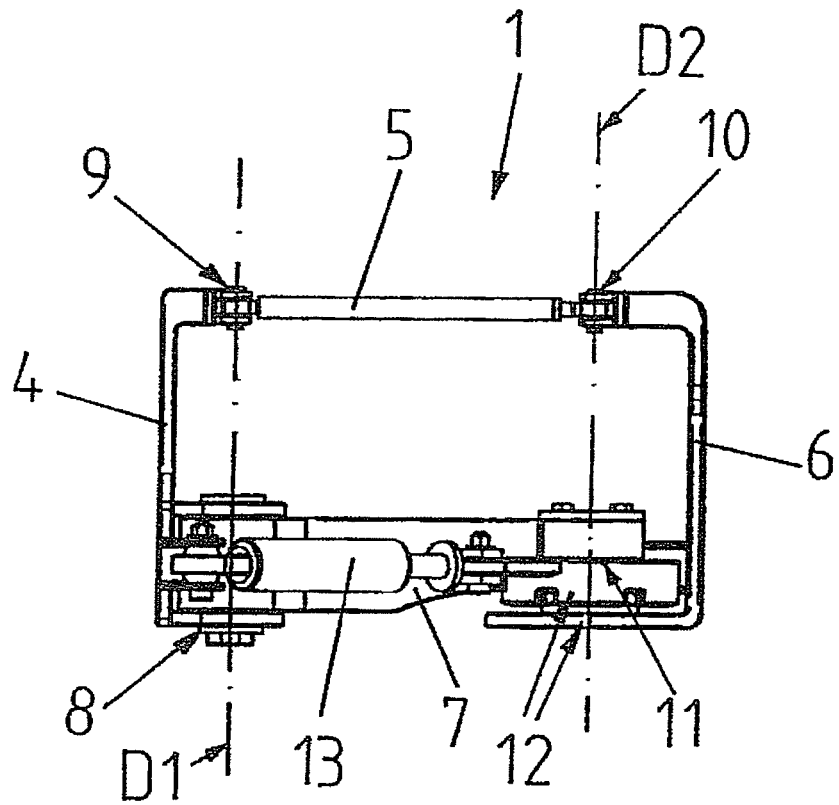
FIG. 3 is a side view of the hinge assembly of the FIGS. 1 and 2.
Figure 4:
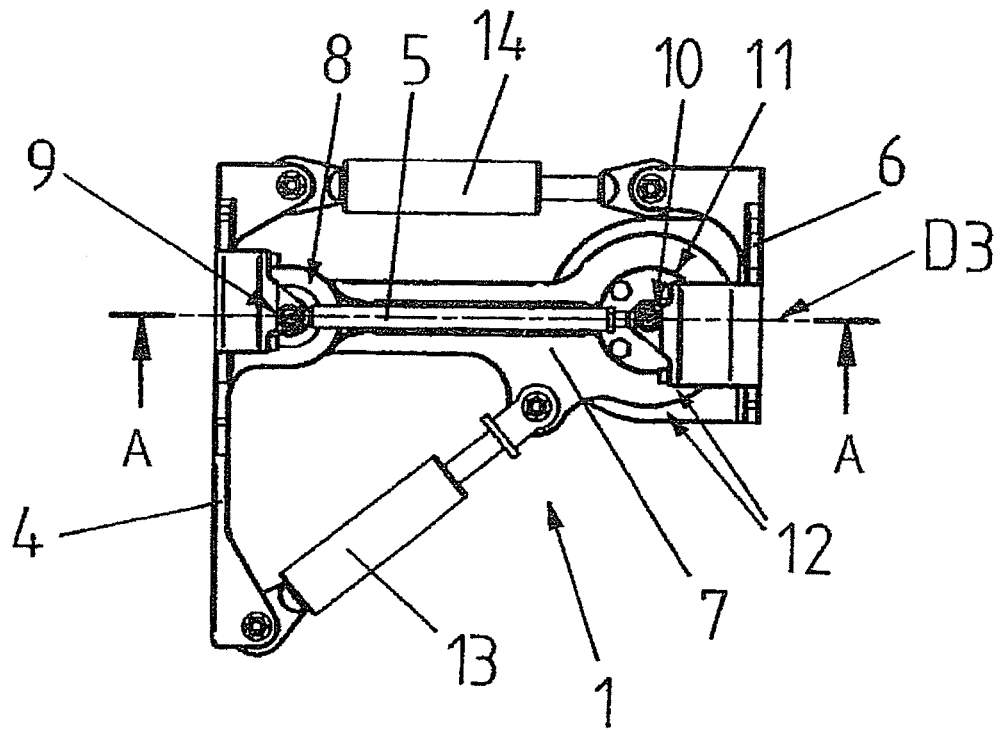
FIG. 4 is a top view onto the hinge assembly of the FIGS. 1 and 2.
Figure 5:
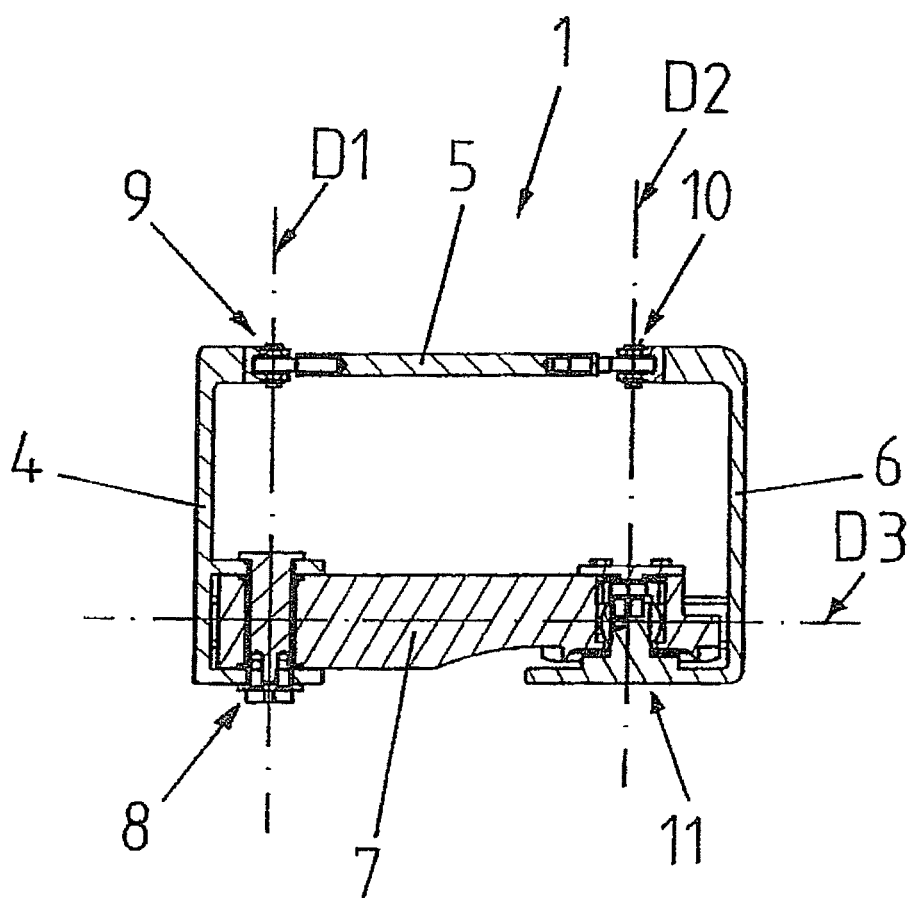
FIG. 5 is a vertical section through the hinge assembly of the FIGS. 1 and 2 along the line A-A in FIG. 4.
Figure 6:
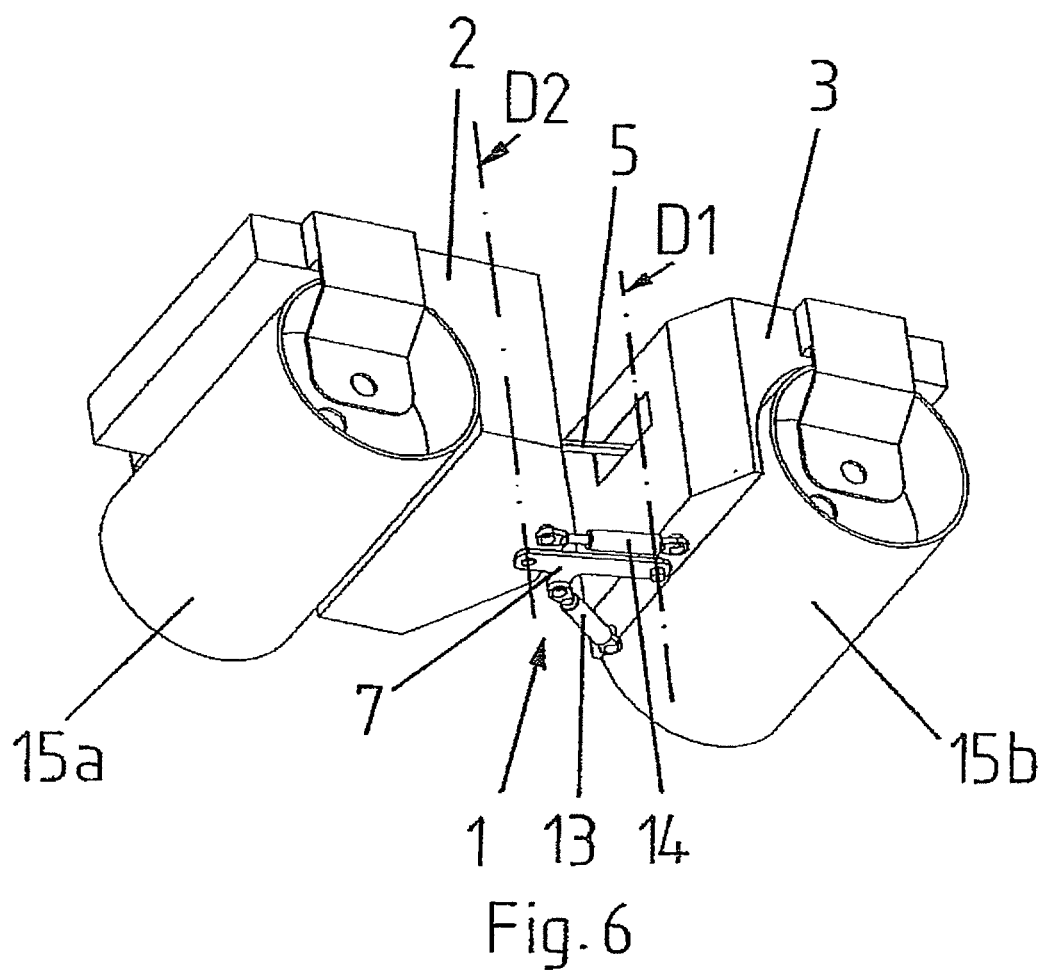
FIG. 6 is a perspective view diagonal from below of a vehicle with articulated frame steering according to the invention.
Figure 7:
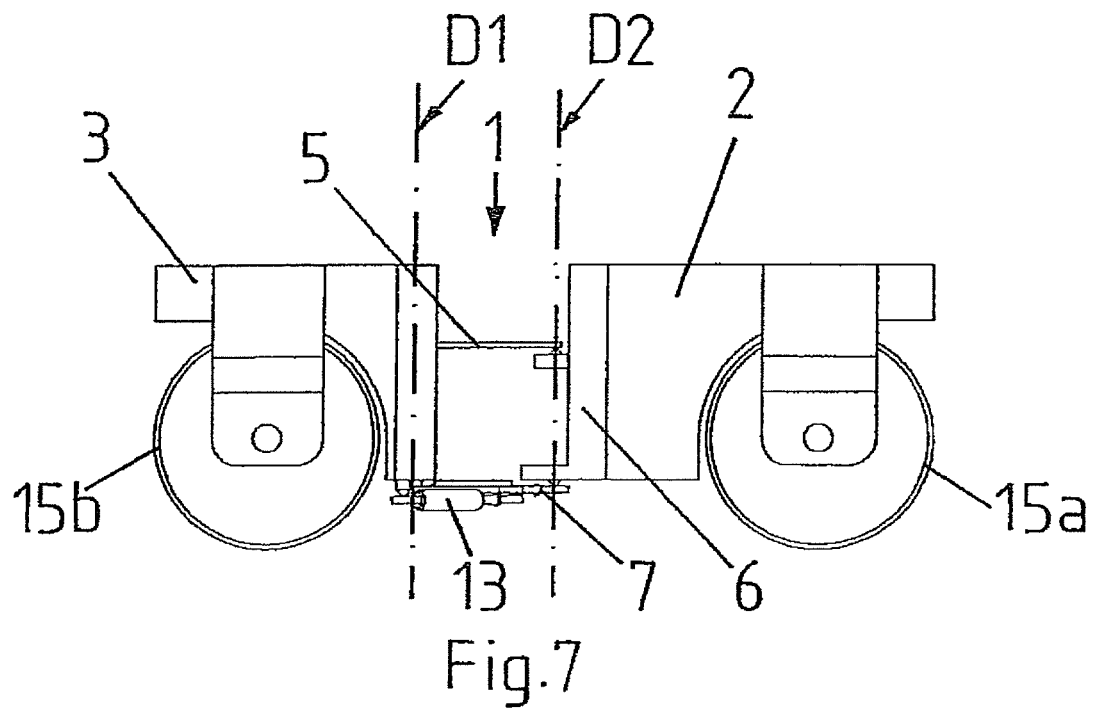
FIG. 7 is a side view of the vehicle of FIG. 6.
Figure 8:
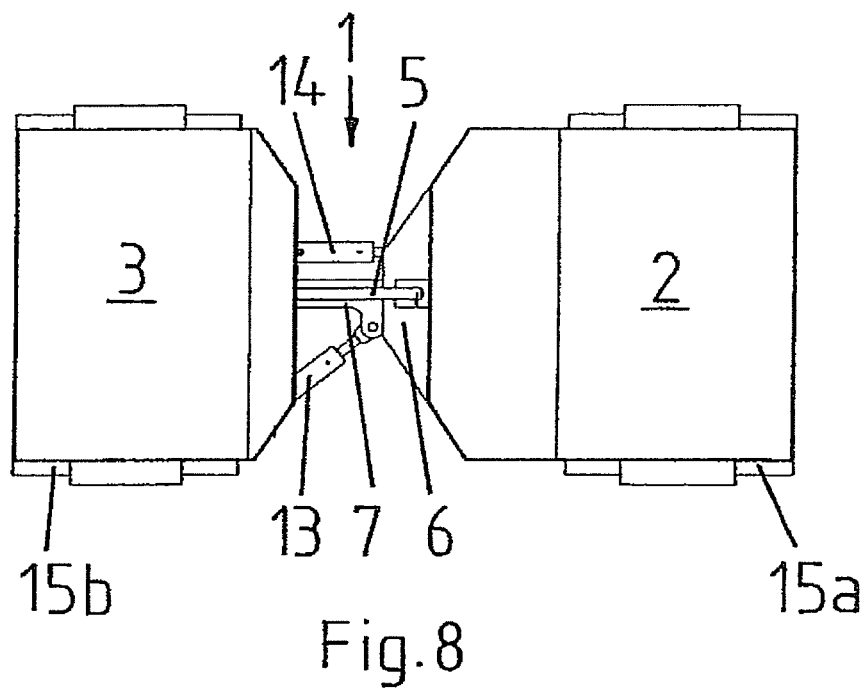
FIG. 8 is a top view onto the vehicle of FIG. 6.

The FIGS. 1 to 5 show a preferred embodiment of a hinge assembly 1 according to the invention, once in a perspective top view diagonal from above from a first side (FIG. 1), once in a perspective top view diagonal from above from a second side (FIG. 2), once in a side view from the second side (FIG. 3), once in a top view (FIG. 4) and once in a vertical section along the line A-A in FIG. 4 (FIG. 5).

As can be seen, the hinge assembly comprises four rigid structural elements 4, 5, 6, 7, of which two are embodied as vertical connecting plates 4, 6 for a front vehicle part and a back vehicle part (not shown), one is embodied as a horizontal swivel arm 7 and one is embodied as a horizontal hinged column 5. The structural elements 4, 5, 6, 7 are connected with each other by four hinge connections 8, 9, 10, 11, wherein the hinge centers of the hinge connections 8, 9, 10, 11 in the basic state, which is shown in the Figures, together define a plane. This plane is identical to a vertical section through the hinge assembly 1 along the line A-A in FIG. 4. Three of the hinge connections are embodied as ball joints 9, 10, 11, while the fourth hinge connection is embodied as pivot joint 8, which as sole degree of freedom permits a rotation of the swivel arm 7 that is connected by it to one of the two connecting plates 4 relative to this connecting plate 4 about a vertical rotational axis D1. This rotational axis D1 is located in the plane that is in the basic state defined by the hinge centers and by doing so runs through the hinge center of the ball joint 9 which is located vertically above it.

In this way, the two connecting plates 4, 6, the hinged column 5 and the swivel arm 7 together with the three ball joints 9, 10, 11 and the pivot joint 8 form a closed frame which is rigid with respect to thrust forces acting along the plane defined by the hinge centers. At the same time, a rotation of the two connecting plates 4, 6 with respect to the swivel arm 7 and with respect to the hinged column 5 in the joints 8, 9, 10, 11 in each case about one of the vertical rotational axis D1, D2 is possible.

Moreover, the connecting plate 6, which in the side view is shown in FIG. 3 on the right, together with the hinged column 5, to which it is directly connected via the ball joint 10, can be tilted, starting from the depicted basic status, in such a manner with respect to the other connecting plate 4 and the horizontal swivel arm 7 that the hinge center of the ball joint 10 can to both sides emerge out of the plane defined by the hinge centers in the basic state without having the other three hinge connections 8, 9, 11 to leave this plane. By means of this a rotation of the rotational axis D1, D2 of the two connecting plates 4, 6 relative to each other substantially about a horizontal rotational axis D3 becomes possible, which is also referred to as articulation of the rotational axis D1, D2 relative to each other.

This articulation is positively limited in that the horizontal swivel arm 7 at its bottom side in the region surrounding the ball joint 11 comprises a flange like stop means 12, which in the basic state is positioned opposite to a stop member 12 of the connecting plate 6 at a small even distance and, when the connecting plate 6 is tilted with respect to the swivel arm 7 about the hinge center of the ball joint 11, at a specific tilting angle abuts against the stop means 12 of the connecting plate 6. The possible tilting angle is identical for both tilting sides.

As can further be seen, between the connecting plate 4 which is depicted in FIG. 3 on the left and the horizontal swivel arm 7 there is arranged a hydraulic piston-cylinder unit 13, by means of which a specific angle of rotation of this connecting plate 4 about the rotational axis D1 relative to the hinged column 5 and the swivel arm 7 can be set and locked. In addition, there is arranged a further hydraulic piston-cylinder unit 14 between the two connecting plates 4, 6, by means of which a specific angle of rotation of the two connecting plates 4, 6 relative to each other can be set and locked, with a possible rotation of the connecting plate 6 relative to the swivel arm 7 and the hinged column 5 about the rotational axis D2.

As is evident from FIG. 5, which shows a vertical section through the hinge assembly in the basic state along the line A-A in FIG. 4, the rotational axis D1, D2 of the two connecting plates 4, 6 in the basic state run parallel to each other in the plane defined by the hinge centers.

Even though the structural elements 4, 5, 6, 7 of the hinge assembly according to the invention which is depicted in the FIGS. 1 to 5 exclusively are rigid structural elements with a fixed geometry, it is envisaged in further preferred variants of this embodiment to design several of these structural elements in such a manner that the position, which the rotational axis D1, D2 of the two connecting plates 4, 6 in the basic state have relative to each other in the plane defined by the hinge centers, is alterable. This can be achieved for example in that the swivel arm 7 and/or the hinged column 5 is designed in such a manner that it is adjustable in its length or that the hinged column 5 is embodied as a spring support the length of which is alterable dependent from a tensile-compressive-loading.

Figure 9A:
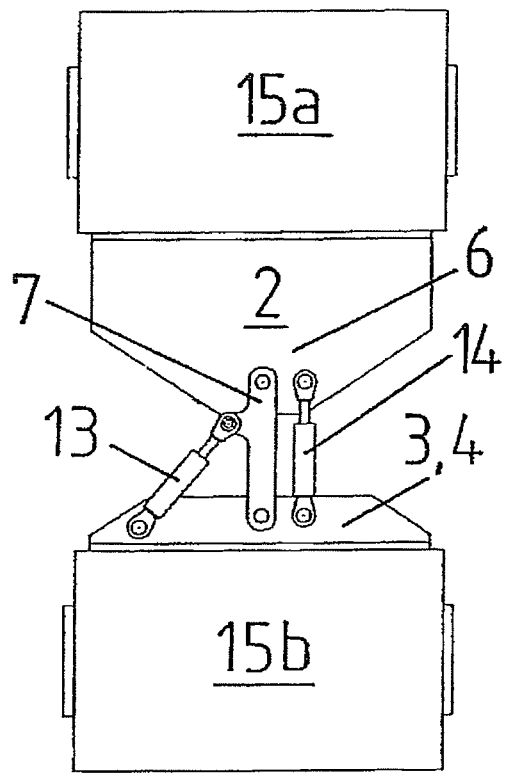
FIGS. 9a and 9b are views of the vehicle of FIG. 6 at directional stability from below, once without and once with offset of the rolls.
Figure 9B:
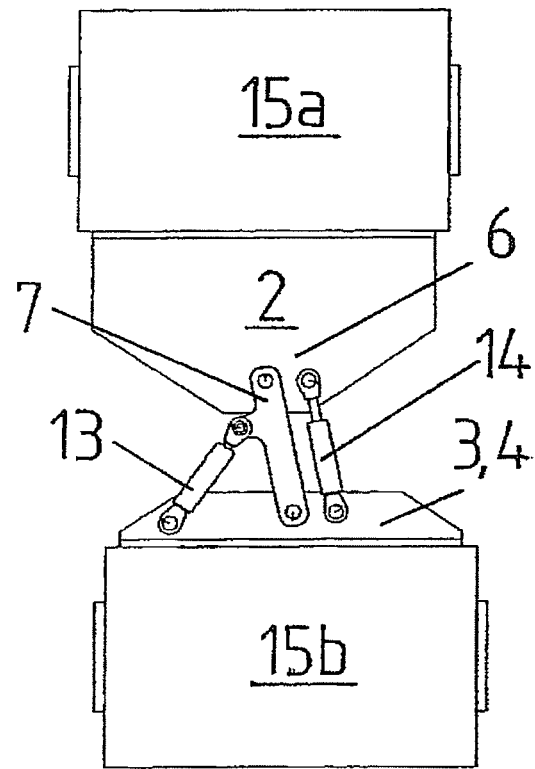
Figure 10A:
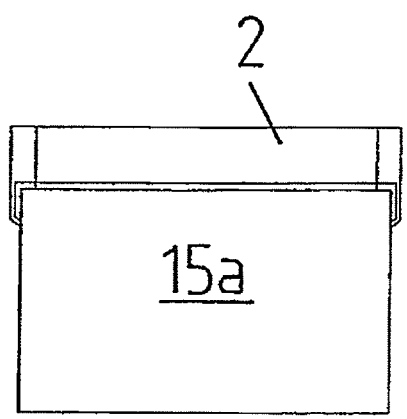
FIGS. 10a and 10b are views of the vehicle of FIG. 6 from the front, once without and once with offset of the rolls.
Figure 10B:
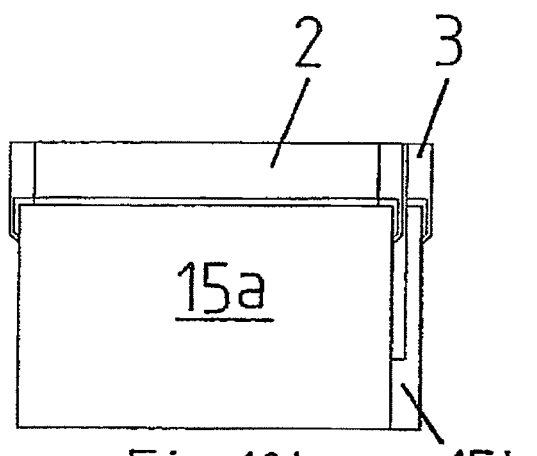
Figure 11A:
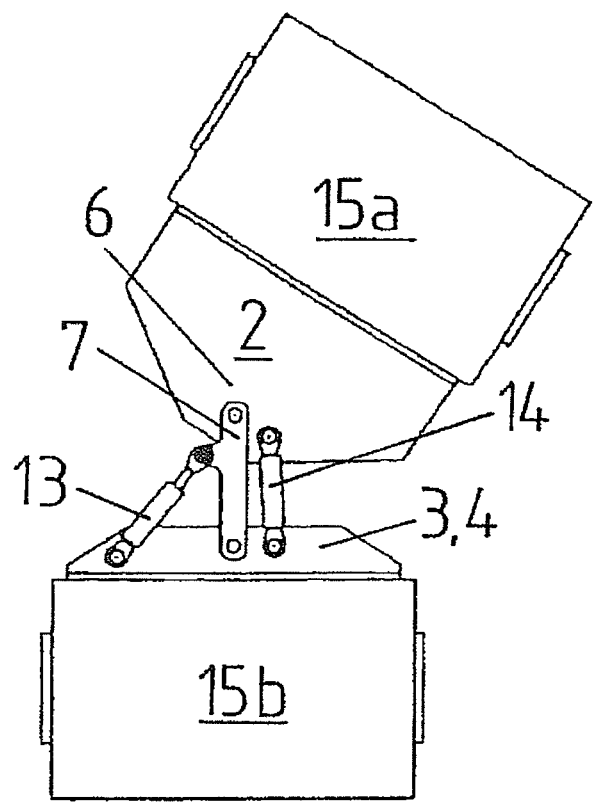
FIGS. 11a and 11b are views of the vehicle of FIG. 6 during cornering from below, once without and once with offset of the rolls.
Figure 11B:
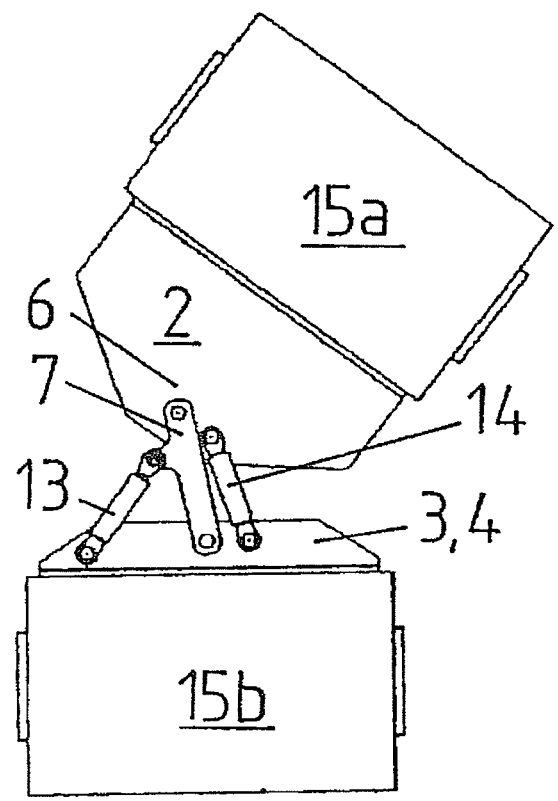

The FIGS. 6 to 11b show a vehicle with articulated frame steering according to the invention, once in a perspective view diagonal from below (FIG. 6), once in the side view (FIG. 7), once in the top view (FIG. 8), from below at directional stability once without (FIG. 9a) and once with offset of the rolls (FIG. 9b), from the front, once without (FIG. 10a) and once with offset of the rolls (FIG. 10b) and during cornering from below, once without (FIG. 11a) and once with offset of the rolls (FIG. 11b).

As becomes apparent, the vehicle with articulated frame steering according to the invention consists of two vehicle parts 2, 3 having in each case a rigid vehicle axle with a plain roll 15a, 15b, which, by a hinge assembly 1 according to the invention that except of some minor design changes is identically to the one of the FIGS. 1 to 5, in an articulated frame steering manner are connected to form a tandem roller. In doing so, each of the two vehicle parts 2, 3 is providing in each case one of the two connecting plates 4, 6 of the hinge assembly 1. The reference numerals in the FIGS. 6 to 11b are identical to those of the FIGS. 1 to 5 for in each case functional equal components or rotational axis, respectively, of the hinge assembly 1.

As can be taken from the FIGS. 9a to 10b, starting from the situation depicted in the FIGS. 9a and 10a in which the roller is operated at directional stability without an offset of the rolls 15a, 15b, an offset of the two vehicle parts 2, 3 relative to each other seen in driving direction and therewith of the rolls 15a, 15b relative to each other, which is also referred to as "crab steering offset", can be adjusted by a shortening or a lengthening of the hydraulic piston-cylinder-unit 13 practically without a change in the driving direction.

The setting of the driving direction of the roller is effected by means of the hydraulic piston-cylinder-unit 14 practically without any influence on a possible offset of the rolls.

As can further be taken from the FIGS. 11a and 11b, the "crab steering" can also be set during cornering, e.g. starting from the situation depicted in the FIG. 11a in which the roller is operated without an offset of the rolls, by shortening or lengthening of the hydraulic piston-cylinder-unit 13, again practically without a change in the driving direction.

Figure 1:
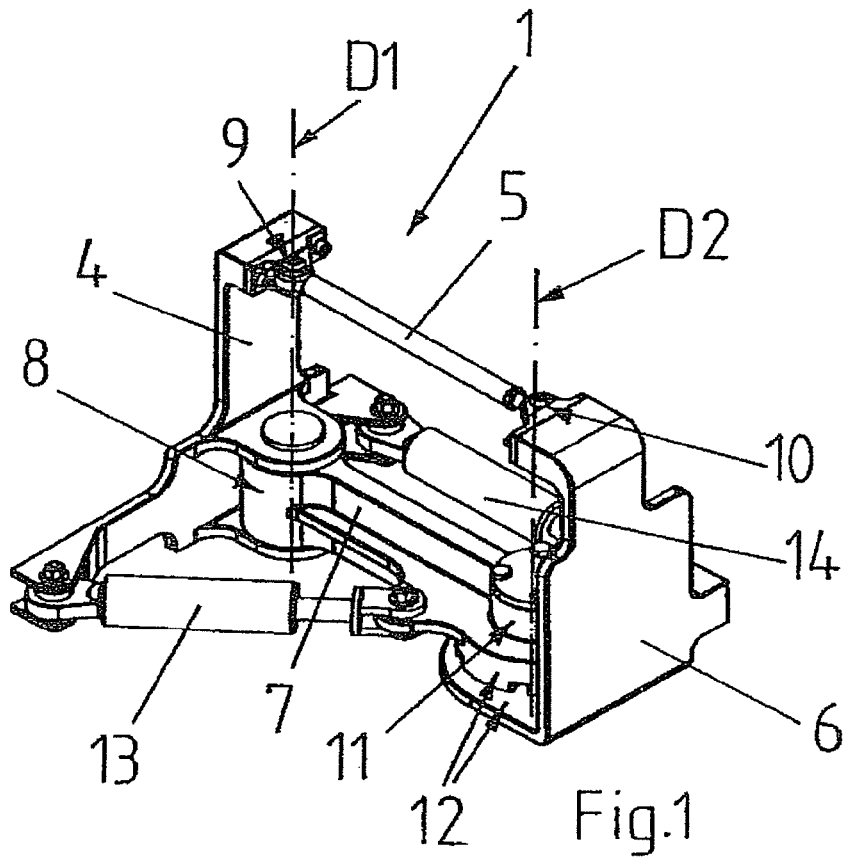
Figure 2:
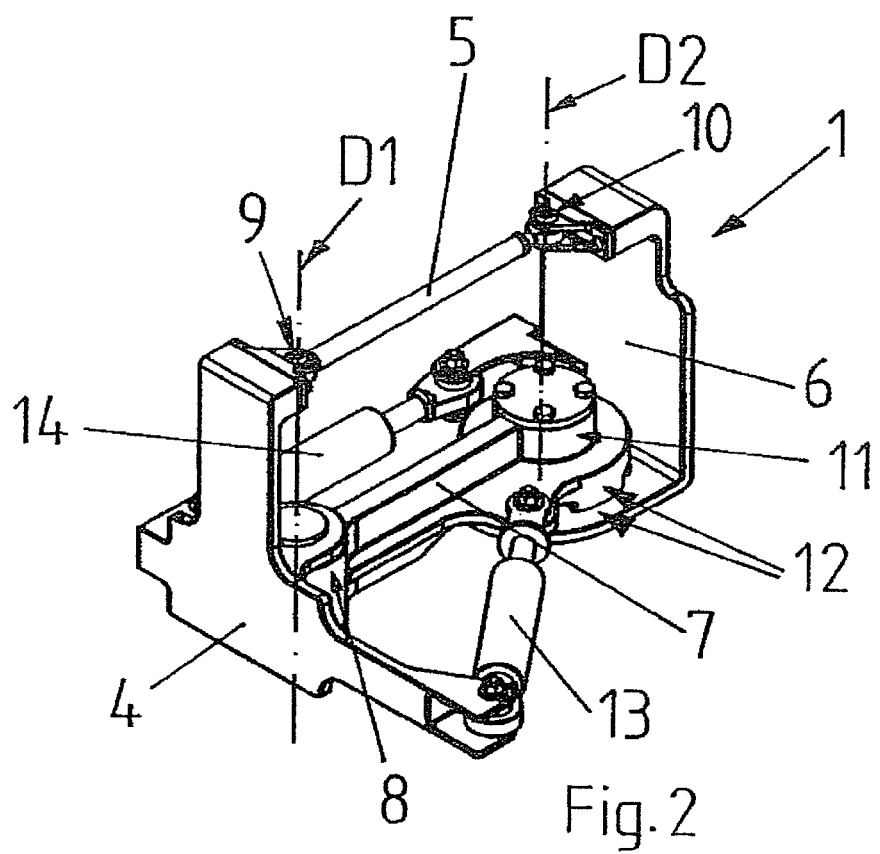
Figure 12:
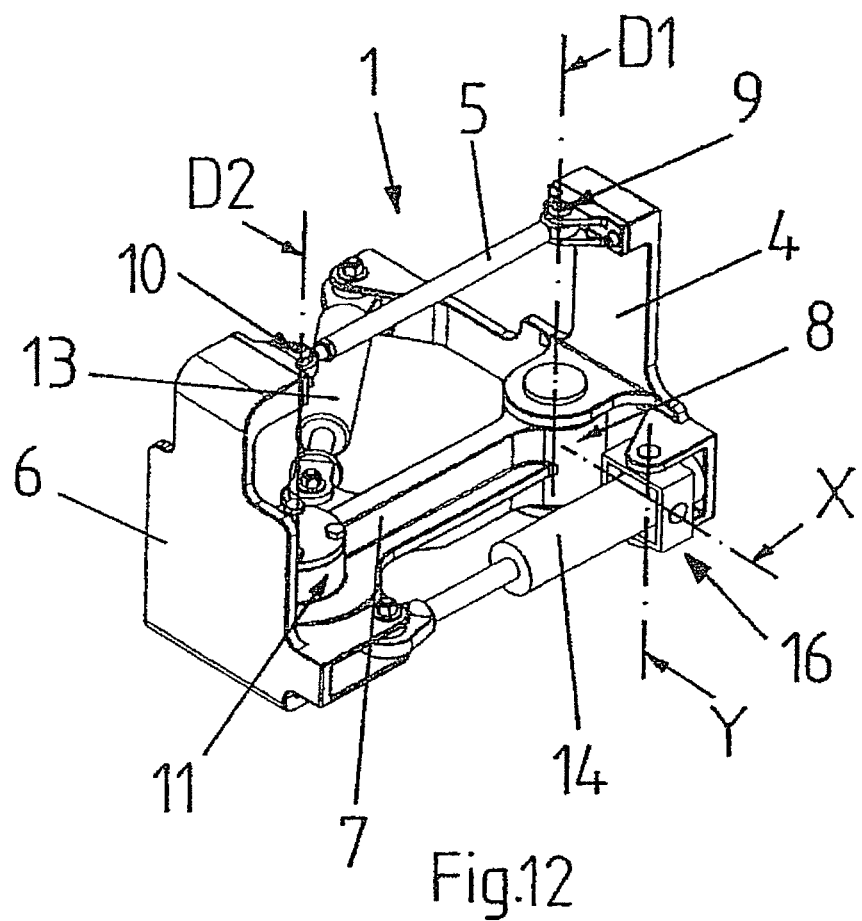
FIG. 12 is a perspective top view diagonal from above onto an embodiment variant of the hinge assembly of FIG. 1.

FIG. 12 shows a perspective top view diagonal from above onto a hinge assembly according to the invention which differs from the hinge assembly of FIG. 1 merely in that the cylinder of the hydraulic piston-cylinder unit 14, which is arranged between the vertical connecting plates 4, 6, is coupled to the connecting plate 4 by means of a cardan joint 16 and not, as in FIG. 1, by means of a ball joint. The cardan joint 16 comprises two rotational axis X, Y which run perpendicular to each other and intersect each other in the center of the joint 16.

While in the present application there are described preferred embodiments of the invention, it is to be clearly pointed out that the invention is not limited thereto and may also otherwise be embodied within the scope of the following claims.

The invention claimed is:

1. Hinge assembly (1) for connecting two vehicle parts (2, 3) having vehicle axles to a vehicle that is capable of crab steering, has articulated frame steering and comprises articulating vehicle axles, comprising four structural elements (4, 5, 6, 7), which are connected to each other by four hinge connections (8, 9, 10, 11) in such a manner that in a basic state, in which the hinge centers of the hinge connections (8, 9, 10, 11) define a common plane, they altogether form a closed frame which is substantially rigid with respect to thrust forces acting along that plane, wherein two of the structural elements (4, 6) which are forming two opposing sides of the frame which is substantially rigid with respect to thrust forces, in each case can be rotated with respect to the remaining structural elements (5, 7) in two of the hinge connections (8, 9; 10, 11) about a rotational axis (D1, D2) which in the basic state is located in the plane defined by the hinge centers and that one (4) of these two structural elements (4, 6) which can be rotated, together with one (5) of the two remaining structural elements (5, 7) to which it is directly connected by one (10) of the hinge connections (8, 9, 10, 11), can be tilted starting from the basic state with respect to the other two structural elements (4, 7) in such a manner that the hinge center of the hinge connection (10), which connects said two tiltable structural elements (4, 5), to both sides can be pivoted out of the plane defined by the hinge centers in the basic state, while the hinge centers of the other three hinge connections (8, 9, 11) stay in this plane, for permitting an articulation of the rotational axis (D1, D2) of the two structural elements (4, 6) which can be rotated relative to each other.

2. Hinge assembly (1) according to claim 1, wherein between two (6, 7) of the structural elements (4, 5, 6, 7) stop means (12) are formed, by which the ability of the hinge center of the hinge connection (10) which is connecting the two tiltable structural elements (4, 5) to be pivoted out of the plane formed by the hinge centers in the basic state is limited, in particular symmetrically around this plane.

3. Hinge assembly (1) according to claim 2, wherein the stop means (12) are formed between two structural elements (6, 7) which are directly connected which each other by one (11) of the hinge connections (8, 9, 10, 11).

4. Hinge assembly (1) according to claim 1, wherein between each of the two structural elements (4, 6) which can be rotated and one of the two remaining structural elements (5, 7) in each case adjustment means are arranged, for setting and locking of a specific rotation angle of the respective structural element (4; 6) which can be rotated relative to the two remaining structural element (5, 7) and the respective other structural element (6; 4) which can be rotated.

5. Hinge assembly (1) according to claim 1, wherein between one (4) of the two structural elements (4, 6) which can be rotated and one (7) of the two remaining structural elements (5, 7) adjustment means (13) are arranged, for setting and locking of a specific rotation angle of said structural element (4) which can be rotated relative to the two remaining structural elements (5, 7), and wherein between the two structural elements (4, 6) which can be rotated, adjustment means (14) are arranged, for setting and locking of a specific rotation angle of the two structural elements (4, 6) which can be rotated relative to each other.

6. Hinge assembly (1) according to claim 4, wherein none of the adjustment means (13) are arranged at those (5) of the two remaining structural elements (5, 7) which, for permitting an articulation of the rotational axis (D1, D2) of the two structural elements (4, 6) which can be rotated relative to each other, can be tilted together with one (6) of the two structural elements (4, 6) which can be rotated.

7. Hinge assembly according to claim 4, wherein at least a part of the linkage points of the adjustment means (13, 14) at the structural elements (4, 5, 6, 7) is designed as a cardan joint.

8. Hinge assembly (1) according to claim 1, wherein the four structural elements (4, 5, 6, 7) are connected by three hinge connections (9, 10, 11) designed as ball joints and by one further hinge connection (8), which ensures the rigidity with respect to thrust forces of the frame formed by the structural elements (4, 5, 6, 7) and the hinge connections (8, 9, 10, 11).

9. Hinge assembly (1) according to claim 8, wherein the further hinge connection (8) is designed in such a manner that as sole degree of freedom it permits a rotation of the structural elements (4, 7) connected by it relative to each other about a rotational axis (D1) which runs in the plane that is in the basic state defined by the hinge centers.

10. Hinge assembly (1) according to claim 1, wherein in the basic state the rotational axis (D1, D2) of the two structural elements (4, 6) which can be rotated run parallel to each other in the plane defined by the hinge centers.

11. Hinge assembly (1) according to claim 1, wherein in the basic state the rotational axis (D1, D2) of the two structural elements (4, 6) which can be rotated run non-parallel to each other in the plane defined be the hinge centers.

12. Hinge assembly (1) according to claim 10, wherein the position, at which the rotational axis (D1, D2) of the two structural elements (4, 6) which can be rotated in the basic state run relative to each other in the plane formed by the hinge centers, can be changed.

13. Hinge assembly (1) according to claim 12, wherein the position of the rotational axis (D1, D2) can be changed in that the distance of two hinge connections relative to each other, which in each case are dedicated to another of the two rotational axis (D1, D2), is adjustable.

14. Hinge assembly (1) according to claim 12, wherein the position of the rotational axis (D1, D2) relative to each other can be changed in that the distance of two hinge connections relative to each other, which in each case are dedicated to another of the two rotational axis (D1, D2), is adjustable in dependency on the tensile and/or thrust forces acting along the plane defined in the basic state by the hinge centers of the hinge connections (8, 9, 10, 11), in particular against a spring force, which in case of release effects a resetting.

15. Vehicle with articulated frame steering having two vehicle parts (2, 3) comprising in each case a vehicle axle, which by a hinge assembly (1) according to claim 1 in an articulated frame steering manner are connected with each other, in that each of the two vehicle parts (2, 3) is connected with one of the two structural elements (4, 6) which can be rotated of the hinge assembly or forms one of these structural elements (4, 6).

16. Vehicle according to claim 15, wherein the vehicle is a tandem roller for compacting asphalt, with two plain rolls (15a, 15b), with one rubber wheel axle and one plain roll or with two rubber wheel axles.

17. Hinge assembly (1) according claim 5, wherein none of the adjustment means (13) are arranged at those (5) of the two remaining structural elements (5, 7) which, for permitting an articulation of the rotational axis (D1, D2) of the two structural elements (4, 6) which can be rotated relative to each other, can be tilted together with one (6) of the two structural elements (4, 6) which can be rotated.

18. Hinge assembly (1) according to claim 11, wherein the position, at which the rotational axis (D1, D2) of the two structural elements (4, 6) which can be rotated in the basic state run relative to each other in the plane formed by the hinge centers, can be changed.

19. Hinge assembly (1) according to claim 13, wherein the position of the rotational axis (D1, D2) relative to each other can be changed in that the distance of two hinge connections relative to each other, which in each case are dedicated to another of the two rotational axis (D1, D2), is adjustable in dependency on the tensile and/or thrust forces acting along the plane defined in the basic state by the hinge centers of the hinge connections (8, 9, 10, 11), in particular against a spring force, which in case of release effects a resetting.

\* \* \* \* \*